United States Patent [19]
Moskovich

[11] Patent Number: 4,620,774
[45] Date of Patent: Nov. 4, 1986

[54] INTERNAL FOCUSING LENS

[75] Inventor: Jacob Moskovich, Cincinnati, Ohio

[73] Assignee: Vivitar Corporation, Santa Monica, Calif.

[21] Appl. No.: 660,291

[22] Filed: Oct. 12, 1984

[51] Int. Cl.$^4$ ............................ G02B 7/04; G02B 9/60
[52] U.S. Cl. ........................................ 350/461; 350/455
[58] Field of Search ................ 350/461, 455, 454, 255

[56] References Cited
U.S. PATENT DOCUMENTS 4,068,929  1/1978  Yokota ................................. 350/455
4,359,272  11/1982  Kreitzer ............................. 350/455

Primary Examiner—John K. Corbin
Assistant Examiner—Rebecca D. Gass
Attorney, Agent, or Firm—Costas, Montgomery & Dorman

[57] ABSTRACT

An internal focusing lens comprising from the object end a first positive group, a second positive group and a third negative group, the second group being axially movable to focus the lens.

17 Claims, 3 Drawing Figures

INTERNAL FOCUSING LENS

FIELD OF THE INVENTION

This invention relates to internal focusing lenses and, more particularly, relates to a lens with internal focusing and also with an automatic focus detection system.

BACKGROUND OF THE INVENTION

Telephoto lenses or lenses having relatively long focal lengths and relatively narrow fields of angular coverage are well known in the prior art. Some of the prior art telephoto lenses provide for internal focusing of a lens element or a group. In general, prior art telephoto lenses employing an internal focusing means have proved unsatisfactory in terms of weight and bulk of the lens. However, U.S. Pat. No. 4,359,272 discloses a compact, lighter internal focusing telephoto lens. The difficulty of obtaining the satisfactory compactness has been exacerbated by the extent of the movement of the internal focusing components which is required in order to obtain the desired focusing range within the overall optical design parameters.

Other deficiencies in prior art telephoto lenses having internal focusing components have been experienced with the necessity of providing internal focusing components which have a relatively large refractive power. The relatively large power is needed to minimize the total travel of these components. But is also presents problems with respect to aberrational corrections of the lens as a whole, both as to monochromatic and chromatic aberrations.

U.S. Pat. No. 4,068,929 discloses an internal focusing rear lens in which a positive component of a negative rear group is movable for focusing.

If the power of that focusing group is increased, the necessary correction of the various field dependant aberrations like distortion, astigmatism, etc., may become very difficult to achieve.

The present invention provides a new and improved internal focusing telephoto lens which is also adapted to have the focusing group driven by a motor in response to a signal received from a focus detector.

SUMMARY OF THE INVENTION

The present invention provides an internal focusing telephoto lens adapted for automatic focusing. The lens is slightly longer than the conventional telephoto lens in that it includes a beam splitter between the last elements and the focal plane; however, it still has a low telephoto ratio. The purpose of the beam splitter is to reflect a small percentage of the light exiting the lens to a focus detector and hence to a microcomputer which directs a motor to move an internally movable group for focusing.

The lens comprises from the object end a first positive group, a second sensitive group in the form of a doublet which is movable along the optical axis, and a third negative group which comprises a negative element with the rear surface strongly concave to the image end and a positive doublet including a biconvex element. The third group is followed by the beam splitter having plano subtending surfaces and an angled internal surface to reflect a relatively small percentage of the light exiting the lens to a focus detector which, in turn, sends a signal to microcomputer which, in turn, directs a motor to drive the second group in a direction to achieve optimum focusing.

A conventional telephoto lens generally comprises an object end positive group widely spaced from an image side negative group where the portion of the rear negative group or a whole lens may be moved axially for focusing. In lenses embodying the invention to provide auto-focusing, a long back focal length is required to provide clearance for the beam splitting prism. Therefore, it is advantageous to move a positive power group for focusing since the movement will be in the direction away from the film plane allowing, in turn, for more space in the back of the lens. To minimize the total travel of the focusing group, the power of that group must be made fairly strong. In the lenses embodying this invention, the large positive power of the front component of the telephoto lens is split between the two groups, and the second group then is used for focusing. In doing so, both of these groups become less sensitive to the variations of the nominal lens parameters ocurring in manufacturing process. It also becomes possible to achieve a great stability of correction of both spherical aberration and astigmatism with focusing, allowing, as a result, for a high image quality throughout the whole focusing range.

To achieve a better correction of distortion and astigmatism with strong positive power in the focusing group, it is preferable to have a rear negative group comprise three elements—a negative element with the rear surface strongly concave to the image plane, and a positive doublet comprising, in turn, a biconcave and a biconvex elements.

An object of this invention is to provide a new and improved internal focusing telephoto zoom lens adapted for automatic focusing.

Another object of this invention is to provide a lens of the type described which is relatively compact and well corrected for aberrations.

The features of the invention which are believed to be novel and particularly pointed out and distinctly claimed in the concluding portion of this specification. The invention, however, together with further objects and advantages thereof, may best be appreciated be reference to the following detailed description taken in conjunction with the drawings.

DESCRIPTION OF PREFERRED EMBODIMENTS OF THE INVENTION

Figure 1:
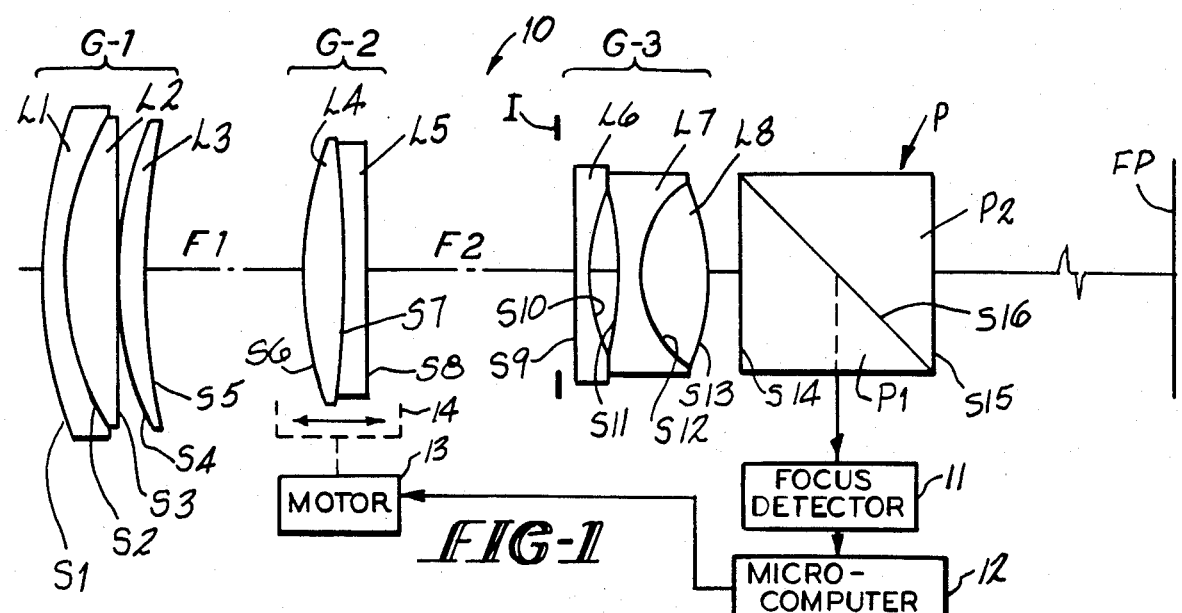
FIG. 1 is a side elevation in schematic form of a lens embodying the invention in conjunction with an autofocusing mechanism.

A lens 10 embodying the invention as shown in FIG. 1 comprises three groups, G1, G2 and G3. Group G1 comprises a positive doublet L1 and L2 in the form of a negative meniscus L1 and a biconvex element L2 followed by a positive meniscus L3.

Group G2, which is axially movable, comprises a biconvex element L4 and a negative element L5. An aperture defining iris I is positioned just before group G3.

Group G3 comprises a negative element with the rear surface concave to the image followed by a positive power doublet comprising biconcave element L6 and biconvex element L8. Group G3 is of overall negative power. Group G3 is followed by a beam splitting prism P with a partially silvered surface S15, between plano surfaces S13 and S14.

The lens groups have certain critical relationships which are hereinafter pointed out.

In FIG. 1, the lens elements L1-L8 are identified by the reference L followed by an arabic numeral from the object to the image end, and the prism P1 has sections identified as P1 and P2 defining the partial mirror surface S15. The surfaces S13 and S14 of the prism are plano. The focal plane of the lens is designated by the reference FP.

Disposed in the lens housing and adapted to receive reflective light from surface S15 is a focus detector 11 which will supply a signal to a microcomputer 12. Microcomputer 12 and focus detector 11 are standard components manufactured by Honeywell Inc. of Minneapolis, Minn. and designated as a TCL automatic focusing detector. This auto-focusing detector is described in U.S. Pat. No. 4,185,191, assigned to Honeywell, Inc. These systems of the equivalent thereof are widely used in auto-focusing cameras and are available from Honeywell, Inc.

Microcomputer 12 controls a motor 12 which, in turn, drives a mechanism indicated in dotted line 14 attached to lens group G2 to move lens group G2 to effect focusing.

In operation, a lens embodying the invention will receive light from the object to be photographed. A portion of this light (approximately fifteen percent) will be reflected from surface S15 to focus detector 11 and hence the motor 13 will move group G2 to determine optimum focusing as defined by microcomputer 12.

Lenses, as shown in FIG. 1 scaled to an image format of 24×36 millimeters, are substantially defined in Tables I-III, together with the spacing distances F1 and F2 of group G2 between groups G1 and G3 for magnifications (M) of 0.0 and −0.1.

As the following prescription tables show, the lens elements from the object end are successively designated L1-L8, the radii of the surfaces of each element are successively designated S1-S13 with the plano surfaces of prism P designated S14 and S15. The axial distance between lens element sufaces are given. The index of refraction of each element is given as $N_d$, and the dispersion of each lens element as measured by its Abbe number is given by $V_d$. The surface radii are positive when defined on a radius from the right on the optical axis, and negative when defined on a radius to the left on the optical axis.

TABLE I

| LENS | SURFACE RADII (mm) | AXIAL DISTANCE BETWEEN SURFACES (mm) | $N_d$ | $V_d$ |
| --- | --- | --- | --- | --- |
| L1 | S1 96.536 | | | |
| | | 3.00 | 1.755 | 27.5 |
| L2 | S2 55.627 | | | |
| | | 9.30 | 1.518 | 59.0 |
| | S3 −1716.968 | | | |
| | | 0.20 | | |
| L3 | S4 61.093 | | | |
| | | 6.20 | 1.518 | 59.0 |
| | S5 166.627 | | | |
| | | F1 | | |
| L4 | S6 95.862 | | | |
| | | 5.70 | 1.518 | 59.0 |
| | S7 −372.234 | | | |
| L5 | | 2.50 | 1.755 | 27.5 |

TABLE I-continued

| | S8 459.365 | | | |
| --- | --- | --- | --- | --- |
| | Aperture | F2 | | |
| | | 1.30 | | |
| | S9 −1706.445 | | | |
| L6 | | 2.50 | 1.743 | 49.2 |
| | S10 34.251 | | | |
| | | 2.56 | | |
| | S11 −138.575 | | | |
| L7 | | 2.00 | 1.658 | 57.3 |
| | S12 15.561 | | | |
| L8 | | 8.00 | 1.667 | 48.3 |
| | S13 −62.828 | | | |
| | | 2.80 | | |
| | S14 PLANO | | | |
| P | | 20.00 | 1.517 | 62.2 |
| | S15 PLANO | | | |

Aperture = f/3.50
EFL = 200.005 mm

| Magnification | F1 | F2 |
| --- | --- | --- |
| 0.0 | 26.24 mm | 14.69 mm |
| −0.1 | 16.30 | 24.63 |

TABLE II

| LENS | SURFACE RADII (mm) | AXIAL DISTANCE BETWEEN SURFACES (mm) | $N_d$ | $V_d$ |
| --- | --- | --- | --- | --- |
| L1 | S1 98.935 | | | |
| | | 3.000 | 1.673 | 32.2 |
| L2 | S2 55.321 | | | |
| | | 9.800 | 1.487 | 70.4 |
| | S3 −866.000 | | | |
| | | 2.000 | | |
| L3 | S4 64.310 | | | |
| | | 5.200 | 1.589 | 61.3 |
| | S5 145.000 | | | |
| | | F1 | | |
| L4 | S6 93.800 | | | |
| | | 5.700 | 1.517 | 64.2 |
| | S7 −222.000 | | | |
| L5 | | 2.500 | 1.673 | 32.2 |
| | S8 373.200 | | | |
| | | F2 | | |
| | Aperture | 1.800 | | |
| | S9 1215.000 | | | |
| L6 | | 2.500 | 1.834 | 37.3 |
| | S10 34.950 | | | |
| | | 2.560 | | |
| | S11 −149.000 | | | |
| L7 | | 1.800 | 1.670 | 57.3 |
| | S12 17.540 | | | |
| L8 | | 8.000 | 1.686 | 43.9 |
| | S13 −63.280 | | | |
| | | 2.800 | | |
| | S14 PLANO | | | |
| P | | 17.300 | 1.517 | 64.2 |
| | S15 PLANO | | | |

Aperture = f/3.46
EFL = 196.179 mm

| Magnification | F1 | F2 |
| --- | --- | --- |
| 0.0 | 27.20 mm | 14.75 mm |
| −0.1 | 16.54 mm | 25.41 mm |

TABLE III

| LENS | SURFACE RADII (mm) | AXIAL DISTANCE BETWEEN SURFACES (mm) | $N_d$ | $V_d$ |
| --- | --- | --- | --- | --- |
| L1 | S1 110.327 | | | |
| | | 3.000 | 8.05 | 25.5 |
| L2 | S2 65.904 | | | |
| | | 9.200 | 6.14 | 56.4 |
| | S3 2347.724 | | | |
| | | 2.000 | | |
| L3 | S4 64.337 | | | |
| | | 5.000 | 5.17 | 64.2 |
| | S5 201.723 | | | |

TABLE III-continued

| LENS | SURFACE RADII (mm) | AXIAL DISTANCE BETWEEN SURFACES (mm) | $N_d$ | $V_d$ |
|---|---|---|---|---|
| | S6 55.296 | F1 | | |
| L4 | | 6.000 | 4.81 | 49.0 |
| | S7 −145.423 | | | |
| L5 | | 2.500 | 8.10 | 24.4 |
| | S8 −9025.777 | | | |
| | | F2 | | |
| | S9 −715.462 | | | |
| L6 | | 2.500 | 7.28 | 49.4 |
| | S10 33.847 | | | |
| | | 3.280 | | |
| | S11 −58.498 | | | |
| L7 | | 2.000 | 4.88 | 76.9 |
| | S12 20.125 | | | |
| L8 | | 6.000 | 4.85 | 51.3 |
| | S13 −41.001 | | | |
| | | 2.923 | | |
| | S14 PLANO | | | |
| P | | 20.000 | 5.17 | 64.2 |
| | S15 PLANO | | | |

Aperture = f/3.50
EFL = 199.950 mm

| Magnification | F1 | F2 |
|---|---|---|
| 0.0 | 40.39 mm | 4.01 mm |
| −0.1 | 34.66 mm | 9.74 mm |

Figure 2:
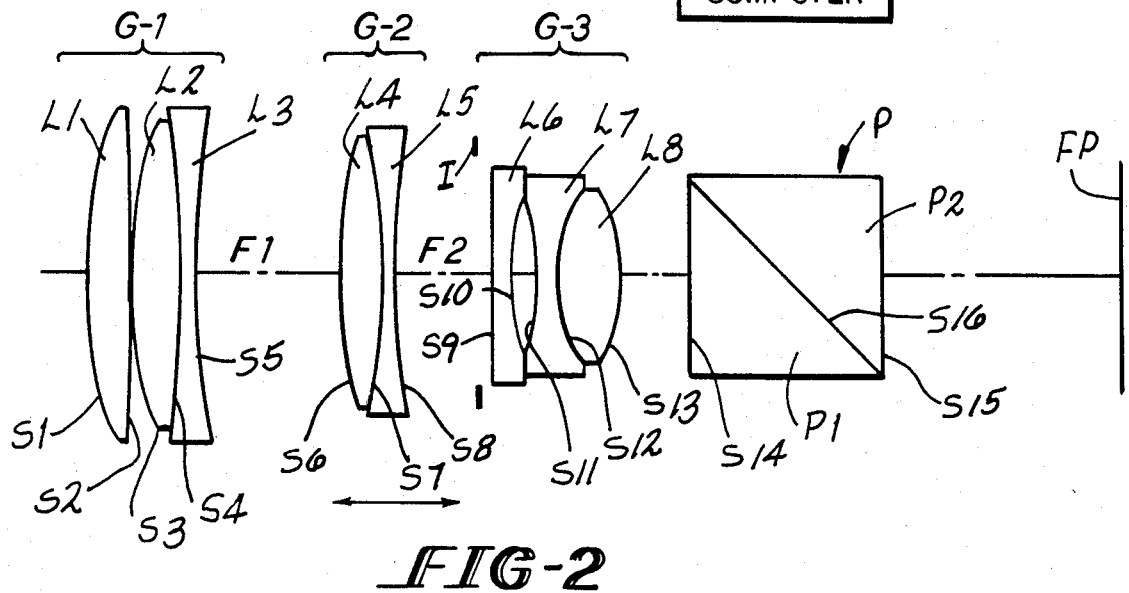
FIG. 2 is a side elevation in schematic form of another lens embodying the invention.

FIG. 2 discloses another lens embodying the invention which differs from the lens of FIG. 1 only in the construction of group G1. In FIG. 2, group G1 comprises from the object end a biconvex element L1 followed by a doublet which consists of a biconvex element L2 and a biconcave element L3. The other groups G2 and G3, as well as the prism P, take the same form as shown in FIG. 1. In FIG. 2, as in FIG. 1, the lens groups are designated by the reference G followed by an arabic numeral from the object to the image end. The lens elements are designated by the reference L followed by an arabic numeral from the object to the image end. The beam splitting prism P has plano subtending surfaces S14 and S15 with a partially reflecting surface S16. The variable distances between group G2 and group G1 and G3 are given by the references F1 and F2 and further designated in prescriptions for the lens of FIG. 2 hereinafter set forth in Tables IV and V.

TABLE IV

| LENS | SURFACE RADII (mm) | AXIAL DISTANCE BETWEEN SURFACES (mm) | $N_d$ | $V_d$ |
|---|---|---|---|---|
| | S1 85.729 | | | |
| L1 | | 8.000 | 4.87 | 70.4 |
| | S2 −718.604 | | | |
| | | .200 | | |
| | S3 66.857 | | | |
| L2 | | 9.000 | 4.87 | 70.4 |
| | S4 −331.326 | | | |
| L3 | | 3.000 | 7.28 | 28.3 |
| | S5 193.007 | | | |
| | | F1 | | |
| | S6 96.992 | | | |
| L4 | | 7.000 | 6.86 | 54.9 |
| | S7 −99.269 | | | |
| L5 | | 2.500 | 1.834 | 37.3 |
| | S8 593.712 | | | |
| | | F2 | | |
| | Aperture | | | |
| | | 2.000 | | |
| | S9 −432.583 | | | |
| L6 | | 2.500 | 8.01 | 48.1 |
| | S10 41.107 | | | |
| | | 2.946 | | |
| | S11 −66.681 | | | |
| L7 | | 2.000 | 6.28 | 60.0 |
| | S12 27.421 | | | |
| L8 | | 8.000 | 5.76 | 42.7 |
| | S13 −40.677 | | | |
| | | 10.742 | | |
| | S14 PLANO | | | |
| P | | 16.215 | 5.17 | 6.42 |
| | S15 PLANO | | | |

Aperture = f/3.50
EFL = 199.894 mm

| Magnification | F1 | F2 |
|---|---|---|
| 0.0 | 19.63 mm | 11.27 mm |
| −0.1 | 13.00 mm | 17.90 mm |

TABLE V

| LENS | SURFACE RADII (mm) | AXIAL DISTANCE BETWEEN SURFACES (mm) | $N_d$ | $V_d$ |
|---|---|---|---|---|
| | S1 81.000 | | | |
| L1 | | 8.00 | 1.487 | 70.4 |
| | S2 −1999.800 | | | |
| | | 0.20 | | |
| | S3 70.000 | | | |
| L2 | | 9.00 | 1.487 | 70.4 |
| | S4 −473.010 | | | |
| L3 | | 3.00 | 1.728 | 28.3 |
| | S5 172.760 | | | |
| | | F1 | | |
| | S6 91.050 | | | |
| L4 | | 7.00 | 1.620 | 60.3 |
| | S7 −154.000 | | | |
| L5 | | 2.50 | 1.806 | 40.7 |
| | S8 373.200 | | | |
| | | F2 | | |
| | Aperture | | | |
| | | 2.00 | | |
| | S9 −400.000 | | | |
| L6 | | 2.50 | 1.720 | 50.3 |
| | S10 36.000 | | | |
| | | 2.67 | | |
| | S11 −1474.700 | | | |
| L7 | | 2.00 | 1.620 | 60.3 |
| | S12 15.180 | | | |
| L8 | | 8.00 | 1.624 | 47.1 |
| | S13 −93.000 | | | |
| | | 3.50 | | |
| | S14 PLANO | | | |
| P | | 16.215 | 1.517 | 64.2 |
| | S15 PLANO | | | |

Aperture = f/3.50
EFL = 200.190 mm

| Magnification | F1 | F2 |
|---|---|---|
| 0.0 | 29.88 mm | 8.68 mm |
| −0.1 | 19.89 mm | 18.67 mm |

Figure 3:
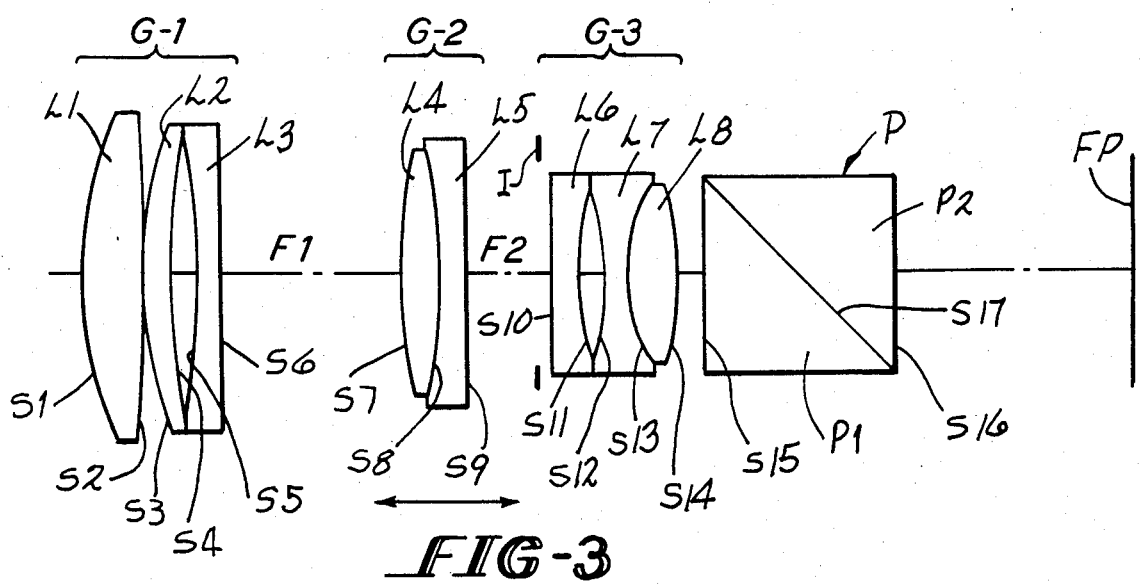
FIG. 3 is a side elevation in schematic form of a further lens embodying the invention.

FIG. 3 exemplified another form of a lens embodying the invention where the front group G1 comprises a biconvex element followed by a positive meniscus convex to the object, and a negative meniscus concave to the object. In FIGS. 2 and 3, the focus detector 11, microcomputer 12, and motor 13 are not shown; however, it will be understood that these lenses are designed for this mechanization. A lens as shown in FIG. 3 is substantially described in Table VI.

TABLE VI

| LENS | SURFACE RADII (mm) | AXIAL DISTANCE BETWEEN SURFACES (mm) | $N_d$ | $V_d$ |
|---|---|---|---|---|
| | S1 65.716 | | | |
| L1 | | 14.500 | 1.487 | 70.4 |
| | S2 −150.157 | | | |
| | | .200 | | |
| | S3 91.696 | | | |
| L2 | | 5.000 | 1.487 | 70.4 |
| | S4 203.206 | | | |
| | | 3.858 | | |
| | S5 −134.078 | | | |

TABLE VI-continued

| | | | | |
|---|---|---|---|---|
| L3 | | 5.000 | 1.805 | 25.5 |
| | S6 −1855.117 | | | |
| | | 28.791 | | |
| | S7 52.053 | | | |
| L4 | | 6.000 | 1.481 | 49.0 |
| | S8 −114.052 | | | |
| L5 | | 2.000 | 1.770 | 26.2 |
| | S9 −1468.531 | | | |
| | | 6.476 | | |
| | S10 824.365 | | | |
| L6 | | 2.500 | 1.704 | 51.2 |
| | S11 30.603 | | | |
| | | 3.175 | | |
| | S12 −71.205 | | | |
| L7 | | 2.000 | 1.490 | 76.6 |
| | S13 24.791 | | | |
| L8 | | 6.000 | 1.519 | 45.5 |
| | S14 −52.827 | | | |
| | | 1.000 | | |
| | S15 PLANO | | | |
| P | | 20.000 | 1.517 | 64.2 |
| | S16 PLANO | | | |

Aperture = f/3.50
EFL = 200.034 mm

| Magnification | F1 | F2 |
|---|---|---|
| 0.0 | 36.85 mm | .42 mm |
| −0.1 | 28.79 mm | 6.48 mm |

In all embodiments set forth, the positive power of the lens is split between groups G1 and G2 in the following relationship $$3.0 > K_1/K_2 > 1.0$$

where $K_1$ is the optical power of group $G_1$ and $K_2$ is the optical power of group $G_2$.

This relationship permits the sensitivity of both groups G1 and G2 to manufacturing tolerances to be reduced and reduces the contributions of spherical aberration.

Also, the ratio of the EFL of group G2 to the EFL of the overall lens is $$1.8 > F_2/F_0 > 0.6$$

where $F_2$ is the EFL of group G2 and $F_0$ is the EFL of the overall lens.

If the ratio falls below the lower limit, the variation of astigmatism with lens (G2) movement for focusing becomes excessive. If $F_2$ becomes larger and hence G2 optically weaker, the length of motion required of G2 becomes excessive, and impractical for automatic focusing.

The third group consists of two components, a negative element L6 and positive doublet L7, L8. Element L6 may be biconcave or a meniscus. In either construction, surface S9 is defined on a very large radius. The doublet is a biconcave element L7 and a biconvex element L8. This construction allows to reduce more effectively positive distortion, and astigmatism which could result from the use of only a doublet or a single element.

To properly correct for chromatic aberration, elements L7 and L8 should have dispersions as measured by their Abbe numbers greater than thirty-five. Additionally, the focal length of the doublet is always greater than 0.5 $F_0$, where $F_0$ is the EFL of the overall lens.

The optical powers $K_1$, $K_2$, $K_3$, and $K_0$ of groups G1, G2, G3, and the overall lens is given for each example in Table VII, where the optical power is the reciprocal of the equivalent focal length in millimeters.

TABLE VII

| Table | $K_1$ | $K_2$ | $K_3$ | $K_0$ |
|---|---|---|---|---|
| I | .0093 | .0032 | −.0137 | .005 |
| II | .0091 | .0031 | −.0132 | .005 |
| III | .0092 | .0066 | −.0169 | .005 |
| IV | .0095 | .0045 | −.0155 | .005 |
| V | .0089 | .0036 | −.0140 | .005 |
| VI | .0087 | .0073 | −.0162 | .005 |

Table VIII sets forth the ratios of the powers $K_1$ and $K_2$ of Groups G1 and G2, respectively, to the power $K_0$ of the overall lens.

TABLE VIII

| Table | $K_1/K_2$ | $K_2/K_0$ | $F_2/F_0$ |
|---|---|---|---|
| I | 2.91 | .64 | 1.56 |
| II | 2.94 | .62 | 1.61 |
| III | 1.39 | 1.32 | .76 |
| IV | 2.11 | .90 | 1.11 |
| V | 2.47 | .72 | 1.39 |
| VI | 1.19 | 1.46 | .68 |

It may be thus seen that the objects of the invention set forth, as well as those made apparent from the foregoing description, are efficiently attained. Preferred embodiments of the invention have been set forth for purposes of disclosure; however, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A lens comprising from the object end a first positive group, a second positive group and a third negative group, said first and third groups being widely spaced, said second group being axially movable to focus said lens while said first and third groups are stationary, said third group consisting of a negative element at the object end followed by a doublet comprising a biconcave element and a biconvex element.

2. The lens of claim 1 where the negative element of said third group is a meniscus.

3. The lens of claim 1 where the negative element of said third group is biconcave.

4. The lens of claim 1 scaled to an image frame of 24×36 mm defined substantially as follows:

| LENS | SURFACE RADII (mm) | AXIAL DISTANCE BETWEEN SURFACES (mm) | $N_d$ | $V_d$ |
|---|---|---|---|---|
| L1 | S1 96.536 | | | |
| | | 3.00 | 1.755 | 27.5 |
| | S2 55.627 | | | |
| L2 | | 9.30 | 1.518 | 59.0 |
| | S3 −1716.968 | | | |
| | | 0.20 | | |
| | S4 61.093 | | | |
| L3 | | 6.20 | 1.518 | 59.0 |
| | S5 166.627 | | | |
| | | F1 | | |
| | S6 95.862 | | | |
| L4 | | 5.70 | 1.518 | 59.0 |
| | S7 −372.234 | | | |
| L5 | | 2.50 | 1.755 | 27.5 |
| | S8 459.365 | | | |
| | | F2 | | |

-continued

| LENS | SURFACE RADII (mm) | AXIAL DISTANCE BETWEEN SURFACES (mm) | $N_d$ | $V_d$ |
|---|---|---|---|---|
| | Aperture | | | |
| | | 1.30 | | |
| | S9 −1706.445 | | | |
| L6 | | 2.50 | 1.743 | 49.2 |
| | S10 34.251 | | | |
| | | 2.56 | | |
| | S11 −138.575 | | | |
| L7 | | 2.00 | 1.658 | 57.3 |
| | S12 15.561 | | | |
| L8 | | 8.00 | 1.667 | 48.3 |
| | S13 −62.828 | | | |
| | | 2.80 | | | where the lens comprises elements L1–L8 from the object end, the lens surfaces are designated S1–S13 from the object end, $N_d$ is the index of refraction of the lens elements, and $V_d$ is the dispersion of the lens elements as expressed by the Abbe number of the lens.

5. The lens of claim 1 scaled to an image frame of 24×36 mm defined substantially as follows:

| LENS | SURFACE RADII (mm) | AXIAL DISTANCE BETWEEN SURFACES (mm) | $N_d$ | $V_d$ |
|---|---|---|---|---|
| | S1 98.935 | | | |
| L1 | | 3.000 | 1.673 | 32.2 |
| | S2 55.321 | | | |
| L2 | | 9.800 | 1.487 | 70.4 |
| | S3 −866.000 | | | |
| | | 2.000 | | |
| | S4 64.310 | | | |
| L3 | | 5.200 | 1.589 | 61.3 |
| | S5 145.000 | | | |
| | | F1 | | |
| | S6 93.800 | | | |
| L4 | | 5.700 | 1.517 | 64.2 |
| | S7 −222.000 | | | |
| L5 | | 2.500 | 1.673 | 32.2 |
| | S8 373.200 | | | |
| | | F2 | | |
| | Aperture | | | |
| | | 1.800 | | |
| | S9 1215.000 | | | |
| L6 | | 2.500 | 1.834 | 37.3 |
| | S10 34.950 | | | |
| | | 2.560 | | |
| | S11 −149.000 | | | |
| L7 | | 1.800 | 1.670 | 57.3 |
| | S12 17.540 | | | |
| L8 | | 8.000 | 1.686 | 43.9 |
| | S13 −63.280 | | | |
| | | 2.800 | | | where the lens comprises elements L1–L8 from the object end, the lens surfaces are designated S1–S13 from the object end, $N_d$ is the index of refraction of the lens elements, and $V_d$ is the dispersion of the lens elements as expressed by the Abbe number of the lens.

6. The lens of claim 1 scaled to an image frame of 24×36 mm defined substantially as follows:

| LENS | SURFACE RADII (mm) | AXIAL DISTANCE BETWEEN SURFACES (mm) | $N_d$ | $V_d$ |
|---|---|---|---|---|
| | S1 110.327 | | | |
| L1 | | 3.000 | 8.05 | 25.5 |
| | S2 65.904 | | | |
| L2 | | 9.200 | 6.14 | 56.4 |
| | S3 2347.724 | | | |
| | | 2.000 | | |
| | S4 64.337 | | | |
| L3 | | 5.000 | 5.17 | 64.2 |
| | S5 201.723 | | | |
| | | F1 | | |
| | S6 55.296 | | | |
| L4 | | 6.000 | 4.81 | 49.0 |
| | S7 −145.423 | | | |
| L5 | | 2.500 | 8.10 | 24.4 |
| | S8 −9025.777 | | | |
| | | F2 | | |
| | S9 −715.462 | | | |
| L6 | | 2.500 | 7.28 | 49.4 |
| | S10 33.847 | | | |
| | | 3.280 | | |
| | S11 −58.498 | | | |
| L7 | | 2.000 | 4.88 | 76.9 |
| | S12 20.125 | | | |
| L8 | | 6.000 | 4.85 | 51.3 |
| | S13 −41.001 | | | |
| | | 2.923 | | | where the lens comprises elements L1–L8 from the object end, the lens surfaces are designated S1–S13 from the object end, $N_d$ is the index of refraction of the lens elements, and $V_d$ is the dispersion of the lens elements as expressed by the Abbe number of the lens.

7. The lens of claim 1 scaled to an image frame of 24×36 mm defined substantially as follows:

| LENS | SURFACE RADII (mm) | AXIAL DISTANCE BETWEEN SURFACES (mm) | $N_d$ | $V_d$ |
|---|---|---|---|---|
| | S1 85.729 | | | |
| L1 | | 8.000 | 4.87 | 70.4 |
| | S2 −718.604 | | | |
| | | .200 | | |
| | S3 66.857 | | | |
| L2 | | 9.000 | 4.87 | 70.4 |
| | S4 −331.326 | | | |
| L3 | | 3.000 | 7.28 | 28.3 |
| | S5 193.007 | | | |
| | | F1 | | |
| | S6 96.992 | | | |
| L4 | | 7.000 | 6.86 | 54.9 |
| | S7 −99.269 | | | |
| L5 | | 2.500 | 1.834 | 37.3 |
| | S8 593.712 | | | |
| | | F2 | | |
| | Aperture | | | |
| | | 2.000 | | |
| | S9 −432.583 | | | |
| L6 | | 2.500 | 8.01 | 48.1 |
| | S10 41.107 | | | |
| | | 2.946 | | |
| | S11 −66.681 | | | |
| L7 | | 2.000 | 6.28 | 60.0 |
| | S12 27.421 | | | |
| L8 | | 8.000 | 5.76 | 42.7 |
| | S13 −40.677 | | | |
| | | 10.742 | | | where the lens comprises elements L1–L8 from the object end, the lens surfaces are designated S1–S13 from the object end, $N_d$ is the index of refraction of the lens elements, and $V_d$ is the dispersion of the lens elements as expressed by the Abbe number of the lens.

8. The lens of claim 1 scaled to an image frame of 24×36 mm defined substantially as follows:

| LENS | SURFACE RADII (mm) | AXIAL DISTANCE BETWEEN SURFACES (mm) | $N_d$ | $V_d$ |
|---|---|---|---|---|
| L1 | S1 81.000 | | | |
| | | 8.00 | 1.487 | 70.4 |
| | S2 −1999.800 | | | |
| | | 0.20 | | |
| | S3 70.000 | | | |
| L2 | | 9.00 | 1.487 | 70.4 |
| | S4 −473.010 | | | |
| L3 | | 3.00 | 1.728 | 28.3 |
| | S5 172.760 | | | |
| | | F1 | | |
| | S6 91.050 | | | |
| L4 | | 7.00 | 1.620 | 60.3 |
| | S7 −154.000 | | | |
| L5 | | 2.50 | 1.806 | 40.7 |
| | S8 373.200 | | | |
| | | F2 | | |
| | Aperture | | | |
| | | 2.00 | | |
| | S9 −400.000 | | | |
| L6 | | 2.50 | 1.720 | 50.3 |
| | S10 36.000 | | | |
| | | 2.67 | | |
| | S11 −1474.700 | | | |
| L7 | | 2.00 | 1.620 | 60.3 |
| | S12 15.180 | | | |
| L8 | | 8.00 | 1.624 | 47.1 |
| | S13 −93.000 | | | |
| | | 3.50 | | | where the lens comprises elements L1–L8 from the object end, the lens surfaces are designated S1–S13 from the object end, $N_d$ is the idex of refraction of the lens elements, and $V_d$ is the dispersion of the lens elements as expressed by the Abbe number of the lens.

9. The lens of claim 1 scaled to an image frame of 24×36 mm defined substantially as follows:

| LENS | SURFACE RADII (mm) | AXIAL DISTANCE BETWEEN SURFACES (mm) | $N_d$ | $V_d$ |
|---|---|---|---|---|
| L1 | S1 65.716 | | | |
| | | 14.500 | 4.87 | 70.4 |
| | S2 −150.157 | | | |
| | | 0.200 | | |
| | S3 91.696 | | | |
| L2 | | 5.000 | 4.87 | 70.4 |
| | S4 203.206 | | | |
| | | 3.858 | | |
| | S5 −134.078 | | | |
| L3 | | 5.000 | 8.05 | 25.5 |
| | S6 −1855.117 | | | |
| | | 28.791 | | |
| | S7 52.053 | | | |
| L4 | | 6.000 | 4.81 | 49.0 |
| | S8 −114.052 | | | |
| L5 | | 2.000 | 7.70 | 26.2 |
| | S9 −1468.531 | | | |
| | | 6.476 | | |
| | S10 824.365 | | | |
| L6 | | 2.500 | 7.04 | 51.2 |
| | S11 30.603 | | | |
| | | 3.175 | | |
| | S12 −71.205 | | | |
| L7 | | 2.000 | 4.90 | 76.6 |
| | S13 24.791 | | | |
| L8 | | 6.000 | 5.19 | 45.5 |
| | S14 −52.827 | | | |
| | | 1.000 | | | where the lens comprises elements L1–L8 from the object end, the lens surfaces aredesignated S1–S14 from the object end, $N_d$ is the index of refraction of the lens elements, and $V_d$ is the dispersion of the lens elements as expressed by the Abbe number of the lens.

10. The lens of claim 1 where both of the elements of said doublet of said third group have a dispersion greater than 35.0 as measured by their Abbe numbers.

11. The lens of claim 1 where $$3.0 > K_1/K_2 > 1.0$$

and $K_1$ and $K_2$ are the optical powers of said first and second groups expressed as the reciprocal of the equivalent focal lengths of said groups.

12. The lens of claim 1 where $$1.8 > F_2/F_0 > 0.6$$

and $F_2$ is the equivalent focal length of said second group and $F_0$ is the equivalent focal length of the overall lens.

13. An automatic focusing lens comprising from the object end a first positive group, a second positive group and a third negative group, said second group being axially movable to focus said lens while said first and third groups are stationary, said third group consisting of a negative element at the object end followed by a doublet comprising a biconcave and a biconvex element, a beam splitting prism positioned behind said third group on the image end side thereof, an automatic focus detector, a motor arranged to move said second lens group axially, said automatic focus detector receiving light from said prism and directing said motor to move said second group.

14. The lens of claim 13 where said negative element of said third group is a meniscus.

15. The lens of claim 14 where said meniscus is convex to the object end.

16. The lens of claim 13 where said negative element of said third group is biconcave.

17. The lens of claim 13 where both of the elements of said doublet of said third group have a dispersion greater than 35.0 as measured by their Abbe numbers.

* * * * *